United States Patent
Kim et al.

(10) Patent No.: US 12,414,052 B2
(45) Date of Patent: Sep. 9, 2025

(54) METHOD AND APPARATUS FOR SPATIAL REUSE BASED ON INTERFERENCE RECOGNITION

(71) Applicant: Korea University of Technology and Education Industry-University Cooperation Foundation, Cheonan-si (KR)

(72) Inventors: Won Tae Kim, Cheonan-si (KR); Han Jin Kim, Cheongju-si (KR); Young Jin Kim, Cheongju-si (KR)

(73) Assignee: Korea University of Technology and Education Industry-University Cooperation Foundation, Cheonan-si (KR)

( * ) Notice: Subject to any disclaimer, the term of this patent is extended or adjusted under 35 U.S.C. 154(b) by 351 days.

(21) Appl. No.: 18/329,598

(22) Filed: Jun. 6, 2023

(65) Prior Publication Data

US 2024/0365245 A1  Oct. 31, 2024

(30) Foreign Application Priority Data

Apr. 28, 2023 (KR) .................. 10-2023-0056114

(51) Int. Cl.
*H04W 52/24* (2009.01)
*H04W 84/12* (2009.01)

(52) U.S. Cl.
CPC ....... *H04W 52/243* (2013.01); *H04W 52/245* (2013.01); *H04W 84/12* (2013.01)

(58) Field of Classification Search
CPC . H04W 52/24; H04W 52/243; H04W 52/245; H04W 84/12; H04L 1/0026; H04L 1/0029
See application file for complete search history.

(56) References Cited

U.S. PATENT DOCUMENTS

| | | | | |
|---|---|---|---|---|
| 10,306,476 | B2* | 5/2019 | Li | H04W 74/006 |
| 11,172,368 | B2* | 11/2021 | Katabathuni | H04W 72/542 |
| 11,838,082 | B2* | 12/2023 | Sergeev | H04B 7/0481 |
| 2017/0150520 | A1* | 5/2017 | Söder | H04W 74/002 |
| 2017/0311166 | A1* | 10/2017 | Li | H04W 16/02 |
| 2021/0153026 | A1* | 5/2021 | Katabathuni | H04W 48/20 |
| 2022/0077911 | A1* | 3/2022 | Sergeev | H04B 7/0626 |

* cited by examiner

*Primary Examiner* — Hai V Nguyen
(74) *Attorney, Agent, or Firm* — STIP Law Group, LLC

(57) ABSTRACT

A spatial reuse (SR) method in a wireless LAN (WLAN) system may be provided.
The operating method according to an embodiment of the present disclosure may include: the SR system according to an embodiment of the present disclosure may include: detecting a new signal by receiving communication environment information, comparing strength of the new signal with a first threshold, determining whether the new signal is a target signal of the WLAN system based on the determination that the strength of the new signal exceeds the first threshold, determining whether the new signal is a negligible signal based on the determination that the new signal is not a target signal of the WLAN system and performing spatial reuse simultaneous transmission by adjusting transmission power based on the determination that the new signal is the negligible signal.

5 Claims, 5 Drawing Sheets

METHOD AND APPARATUS FOR SPATIAL REUSE BASED ON INTERFERENCE RECOGNITION

CROSS-REFERENCE TO RELATED APPLICATIONS

This application claims the priority of the Korean Patent Application NO 10-2023-0056114, filed on Apr. 28, 2023, in the Korean Intellectual Property Office. The entire disclosures of all these applications are hereby incorporated by reference.

BACKGROUND

1. Field

One or more embodiments relate to a method and an apparatus for spatial reuse based on interference recognition, and more particularly, to a method and an apparatus for spatial reuse based on interference recognition capable of increasing spatial reuse efficiency by classifying interference sources in a communication environment.

2. Description of the Related Art

Rapid increase in mobile traffic is causing an increasingly dense communication environment. Even in WiFi based on the Institute of Electrical and Electronic Engineers (IEEE) 802.11 standard, access points (APs) for communication are being distributed more densely with the popularity of wireless local area network (WLAN). The distribution of dense APs may improve the efficiency and service of the entire communication network, but performance may deteriorate due to interference caused by overlapping communication environments.

Wi-Fi is a WLAN technology that allows devices to access the Internet in the 2.4 GHz, 5 GHz or 60 GHz frequency bands. WLAN is based on the IEEE 802.11 standard. The wireless next generation standing committee (WNG SC) of IEEE 802.11 is the ad-hoc committee that considers the next-generation WLAN in the medium to long term.

A scenario mainly considered in IEEE 802.11ax is a dense environment with many APs and stations (STAs), and IEEE 802.11ax discusses improvement of spectrum efficiency and area throughput in this situation. In particular, attention is paid to practical performance improvement not only in an indoor environment, but also in an outdoor environment, which has not been considered much in existing WLANs.

IEEE 802.11ax developed a standard called spatial reuse (SR) that improves spectrum efficiency by increasing the number of parallel transmissions in high-density deployment. An SR technology may perform simultaneous transmission by distinguishing between transmission of its own cell (basic service sets (BSS)) and transmission of other cells (overlapping basic service sets (OBSS)).

The present disclosure provides a spatial reuse method capable of minimizing collisions caused by hidden nodes while improving spectrum efficiency and an apparatus for performing the spatial reuse method.

The background described above is possessed or acquired by the inventor in the process of deriving the present disclosure, and is not necessarily known art published to the public prior to the filing of the present disclosure.

DESCRIPTION OF EMBODIMENTS

Technical Solution

As an embodiment of the present disclosure, A spatial reuse (SR) method in a wireless LAN (WLAN) system may be provided.

The SR system according to an embodiment of the present disclosure may include: detecting a new signal by receiving communication environment information, comparing strength of the new signal with a first threshold, determining whether the new signal is a target signal of the WLAN system based on the determination that the strength of the new signal exceeds the first threshold, determining whether the new signal is a negligible signal based on the determination that the new signal is not a target signal of the WLAN system and performing spatial reuse simultaneous transmission by adjusting transmission power based on the determination that the new signal is the negligible signal.

The SR system according to an embodiment of the present disclosure may further include: determining a power level corresponding to the new signal based on the determination that the new signal is the negligible signal.

The performing spatial reuse simultaneous transmission according to an embodiment of the present disclosure may include: adjusting an allowable power range based on the power level corresponding to the new signal and performing the spatial reuse simultaneous transmission within the allowable power range.

The determining whether the new signal is the negligible signal according to an embodiment of the present disclosure may include: determining whether the new signal uses a target band corresponding to the target signal of the WLAN system and determining whether the new signal is a signal originating from a preset device based on the determination that the new signal uses the target band.

The determining whether the new signal is the negligible signal according to an embodiment of the present disclosure may include: determining whether the new signal is a signal originating from a non-communication device based on the determination that the new signal uses the target band, determining whether the new signal is a signal originating from a Bluetooth device based on the determination that the new signal uses the target band and determining whether the new signal is a signal originating from a ZigBee device based on the determination that the new signal uses the target band.

The comparing strength of the new signal with a first threshold according to an embodiment of the present disclosure may include: comparing the strength of a new signal with a first threshold according to an embodiment may include comparing a received signal strength indicator (RSSI) of the new signal with a clear channel assessment/carrier sense (CCA/CS) threshold, and determining whether the new signal is a target signal of the WLAN system may include determining whether the new signal is an 802.11 frame.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Hereinafter, embodiments of the present invention will be described with reference to the drawings. In the following description, descriptions of a well-known technical configuration in relation to a lead implantation system for a deep brain stimulator will be omitted. For example, descriptions of the configuration/structure/method of a device or system commonly used in deep brain stimulation, such as the structure of an implantable pulse generator, a connection structure/method of the implantable pulse generator and a lead, and a process for transmitting and receiving electrical signals measured through the lead with an external device, will be omitted. Even if these descriptions are omitted, one of ordinary skill in the art will be able to easily understand the characteristic configuration of the present invention through the following description.

Figure 1A:
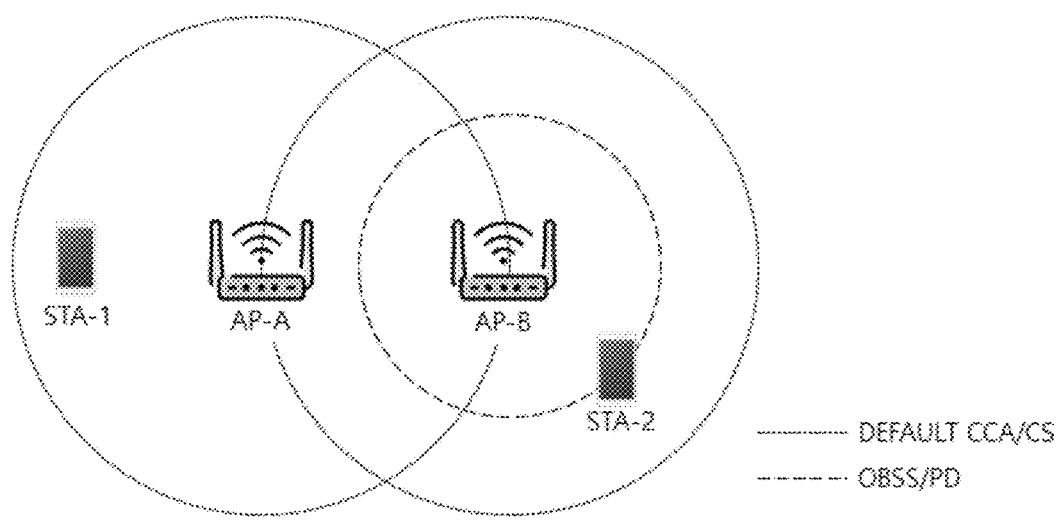
FIGS. 1A and 1B are views for explaining a spatial reuse technology.
Figure 1B:
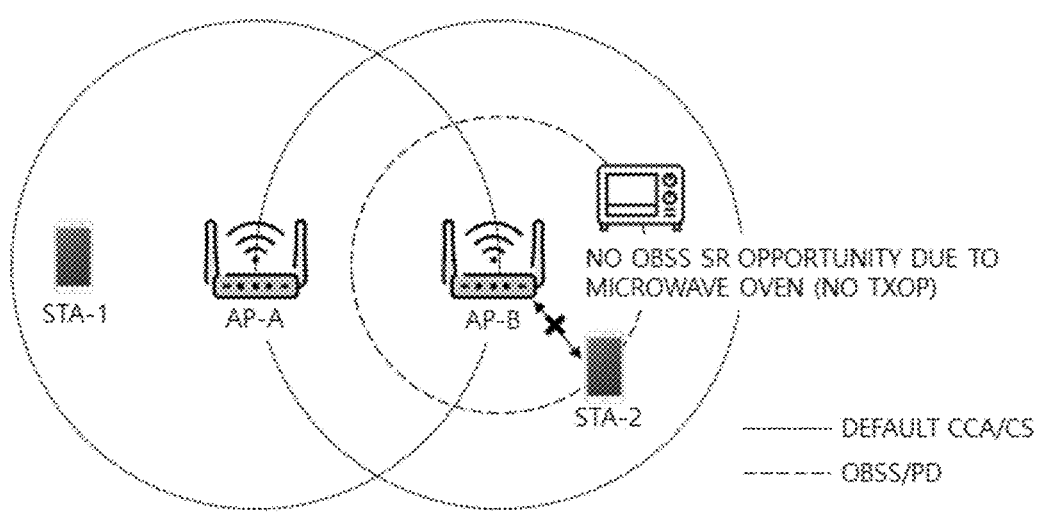

FIGS. 1A and 1B are views for explaining a spatial reuse technology.

IEEE 802.11ax developed a standard called spatial reuse (SR) that improves spectrum efficiency by increasing the number of parallel transmissions in high-density deployment. An SR technology may perform simultaneous transmission by distinguishing between transmission of its own cell (basic service sets (BSS)) and transmission of other cells (overlapping basic service sets (OBSS)). Hereinafter, a spatial reuse method may be referred to as SR.

BSS is a network structure composed of one AP and STAs managed by the AP. Referring to FIG. 1A, first BSS may be a network composed of AP-A and STA-1 managed by AP-A, and second BSS may be a network composed of AP-B and STA-2 managed by AP-B. OBSS refers to an environment in which BSS, which is one basic service cell managed by one AP, shares a physical space with BSSs managed by a plurality of other APs using the same band. APs or terminals to be transmitted within the OBSS simultaneously compete with APs and terminals belonging to other adjacent BSSs to occupy a channel. At the same time, as the number of competing terminals increases, various problems may occur, such as a lower success rate of channel occupancy or a higher probability of transmission failure due to collision of transmission packets.

In the 802.11ax standard, simultaneous transmission may be performed by obtaining an SR transmission opportunity (TXOP) when signals from other BSSs do not exceed an OBSS_PD (Packet Detection) threshold. The OBSS_PD threshold is adjustable and may be determined as a value between CCA-SD and CCA-ED. At this time, STA using the SR transmission opportunity needs to reduce a transmission power level in inverse proportion to the increase of the OBSS_PD threshold. Depending on the OBSS_PD threshold, more SR transmission opportunities may be obtained to improve spectrum efficiency, but on the contrary, collisions caused by hidden nodes may be observed.

At this time, the STA using the SR transmission opportunity needs to reduce a transmission power level in inverse proportion to the increase of the OBSS_PD threshold. Depending on the OBSS_PD threshold, more SR transmission opportunities may be obtained to improve spectrum efficiency, but on the contrary, collisions caused by hidden nodes may be observed.

Referring to FIG. 1A, several comparable SR techniques consider the strength of another BSS signal (e.g., RSSI) and adjust an algorithm for setting the OBSS_PD threshold or transmission power. For example, several comparable SR techniques perform simultaneous transmission through SR at a level (green) that does not cause interference to other BSS communication nodes when the strength of another BSS signal does not exceed the OBSS_PD threshold, thereby increasing spectrum efficiency (spatial reuse efficiency).

However, an environment in which an IEEE 802.11-based WiFi devices communicate is a communication environment using an industrial scientific medical (ISM) band in which Bluetooth, ZigBee, or even a microwave oven exists in addition to other BSS (WiFi) devices.

In more detail, an ISM band used by WiFi may be used for industrial, scientific, medical, and household purposes other than telecommunication, and includes microwave ovens and medical machines (e.g., diathermy machines). In addition, in the ISM band, joint use that tolerates mutual interference is premised, and small power is based on minimizing interference. Therefore, in order to improve spectrum efficiency and minimize collisions caused by hidden nodes, other BSS signals and other influencing signals (e.g. signals emitted from devices such as Bluetooth, ZigBee, and microwave ovens) need to be considered.

Referring to FIG. 1B, when there are devices using the ISM band, such as microwave ovens, SR simultaneous transmission may be difficult because the power intensity of microwave oven signals exceeds the OBSS_PD threshold even though communication may be performed ignoring signals.

As will be described in detail below, the spatial reuse method according to an embodiment complements the difficulty of securing spectrum efficiency and minimizing collisions because the spatial reuse method does not consider WiFi signals and other influencing signals, and classifies interference sources in a communication environment to support high-efficiency spatial reuse based on the information.

Figure 2:
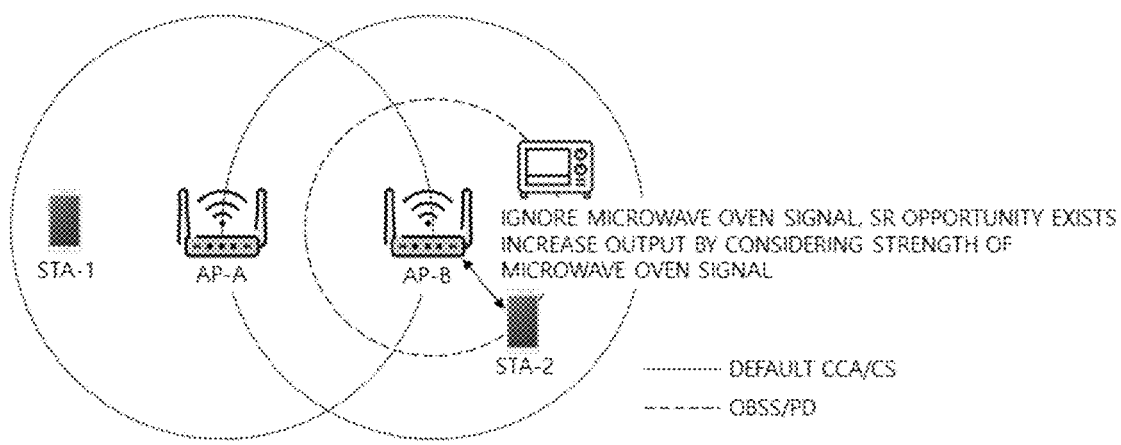
FIG. 2 is a view for explaining a method of increasing spatial reuse efficiency by recognizing interference signals according to an embodiment.

FIG. 2 is a view for explaining a method of increasing spatial reuse efficiency by recognizing interference signals according to an embodiment.

Referring to FIG. 2, according to the spatial reuse method according to an embodiment, during SR simultaneous transmission, signals having little interference effect even if they are ignored, such as microwave oven signals, are ignored to maximize an SR simultaneous transmission opportunity, and at this time, communication performance may be improved by controlling output considering the power intensity of the corresponding signal.

Figure 3:
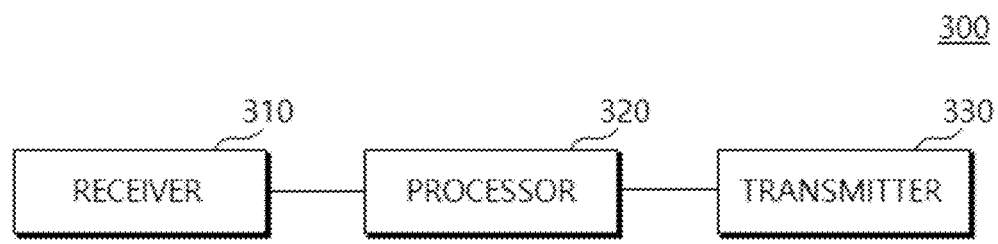
FIG. 3 is a block diagram of a spatial reuse apparatus according to an embodiment.

FIG. 3 is a block diagram of a spatial reuse apparatus according to an embodiment.

Referring to FIG. 3, a spatial reuse apparatus 300 according to an embodiment may include a receiver 310, a processor 320, and a transmitter 330. However, the elements, shown in FIG. 3, are not essential elements. The spatial reuse apparatus 300 may be implemented by using more or less elements than those shown in FIG. 3. For example, in addition to the receiver 310, the processor 320, and the transmitter 330 according to an embodiment, the spatial reuse apparatus 300 according to an embodiment may further include a sensor and a memory in addition to the receiver 310, the processor 320, and the transmitter 330. Terms such as "unit", "er", "or", and the like described herein refer to units that perform at least one function or operation, and the units may be implemented as hardware or software or as a combination of hardware and software.

The receiver 310 according to an embodiment may receive signals within a communication environment.

The processor 320 may detect a new signal, may determine whether the new signal is a negligible signal, and if the new signal is a negligible signal, may obtain an opportunity for SR simultaneous transmission to adjust TX power. The processor 320 may be a hardware-implemented device having a circuit having a physical structure for executing desired operations. The desired operations may include code or instructions included in a program. The hardware-implemented device may include a microprocessor, a central processing unit (CPU), a graphic processing unit (GPU), a processor core, a multi-core processor, a multiprocessor, an application-specific integrated circuit (ASIC), a field programmable gate array (FPGA), a neural processing unit (NPU), and the like.

The memory may store computer-readable instructions. When instructions stored in the memory are executed by the processor 320, the processor 320 may process operations defined by the instructions. The memory may include, for example, random access memories (RAM), dynamic RAM (DRAM), static random access memories (SRAM), or other forms of non-volatile memory known in the art.

The transmitter 330 may perform SR simultaneous transmission when converted to an SR simultaneous transmission mode (e.g., a TX state).

Figure 4:
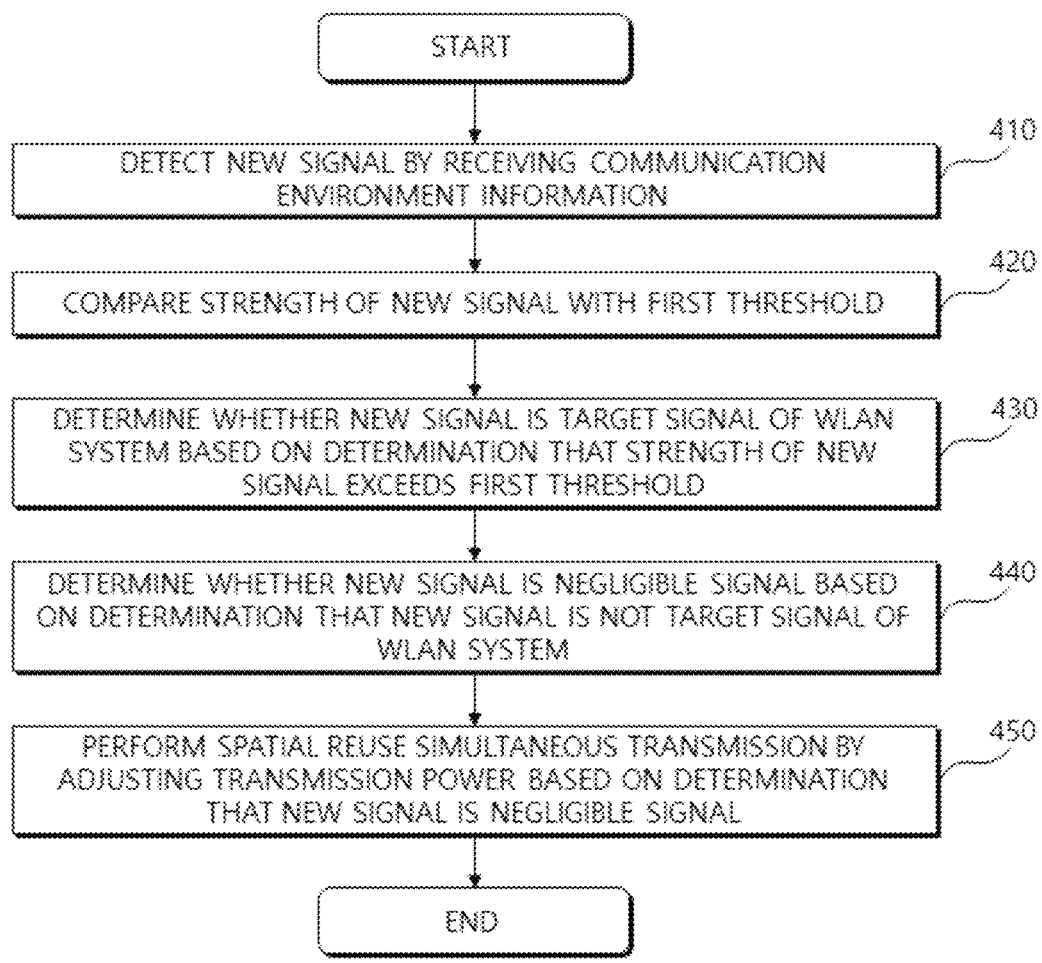
FIG. 4 is a view for explaining a spatial reuse method according to an embodiment.

FIG. 4 is a view for explaining a spatial reuse method according to an embodiment.

For convenience of explanation, operations 410 to 450 are described as being performed using the spatial reuse apparatus 300 shown in FIG. 3. However, operations 410 to 450 may be used via any other suitable electronic device, and within any suitable system.

In addition, operations of FIG. 4 may be performed in the illustrated order and manner, but the order of some operations may be changed or some operations may be omitted without departing from the spirit and scope of the illustrated embodiment. A number of the operations shown in FIG. 4 may be performed in parallel or concurrently.

In operation 410, the spatial reuse apparatus according to an embodiment may detect a new signal by receiving communication environment information. In a sensing state, the spatial reuse apparatus may continuously receive a communication environment.

In operation 420, the spatial reuse apparatus according to an embodiment may compare the strength of a new signal with a first threshold value. When a new signal is detected, the spatial reuse apparatus calculates an RSSI of the corresponding signal and determines whether a corresponding value exceeds a clear channel assessment/carrier sense (CCA/CS) threshold.

In operation 430, the spatial reuse apparatus according to an embodiment may determine whether a new signal is a target signal of a WLAN system based on the determination that the strength of the new signal exceeds the first threshold value. The target signal of the WLAN system according to an embodiment is a target signal of a corresponding WLAN system. For example, in the WLAN system according to an embodiment, a signal using an 802.11ax frame may be a target signal.

In operation 440, the spatial reuse apparatus according to an embodiment may determine whether the new signal is a negligible signal based on the determination that the new signal is not the target signal of the WLAN system.

The spatial reuse apparatus according to an embodiment may determine whether the new signal uses a target band corresponding to the target signal of the WLAN system, and may determine whether the new signal originates from a preset device based on the determination that the new signal uses the target band.

As described above, Bluetooth, ZigBee, and microwave ovens may use the same ISM band as WiFi.

The spatial reuse apparatus according to an embodiment may determine whether the new signal is a signal originating from a non-communication device based on the determination that the new signal uses the target band. For example, the non-communication device may be a microwave oven using the ISM band, but the present disclosure is not limited thereto.

Because the microwave oven is not a device for communication, there may be no abnormality in operation even if interference is received within the same frequency during operation of the microwave oven. Thus, when a microwave oven signal is identified, SR communication may be performed even if the energy of the microwave oven is high (e.g., higher than an OBSS_PD threshold). When an SR transmission opportunity (TXOP) is obtained and SR communication is performed, transmission power (TX power) needs to be greater than power of the microwave oven to stably perform SR communication. The microwave signal may be an interference source to a wireless communication device performing SR communication. Therefore, in this case, transmission power may be set as shown in Equation 1 below.

$$Tx_{power\_new} = Tx_{power} + \alpha \cdot \text{Power}_{microoven} \qquad \text{[Equation 1]}$$

In Equation 1, $Tx_{power\_new}$ is transmission power determined when a signal generated by the microwave oven is a new detected signal, $Tx_{power}$ is basic transmission power of existing SR, and $\text{Power}_{microoven}$ is power of the microwave oven measured when a signal is identified.

The spatial reuse apparatus according to an embodiment may determine whether the new signal is a signal originating from a Bluetooth device based on the determination that the new signal uses the target band.

The Bluetooth device may use a frequency hopping technology as an access method. In addition, the Bluetooth device also applies an adaptive frequency hopping technology to avoid interference with devices using the same channel, such as WiFi and ZigBee (collision is detected during channel scan and the corresponding channel is excluded when dynamically hopping).

Because the Bluetooth device to which the adaptive frequency hopping technology is applied automatically uses another channel when detecting a collision, a device performing SR communication may use SR. That is, a signal generated from the Bluetooth device using the adaptive frequency hopping technology may be determined as a negligible signal.

When the Bluetooth device to which the adaptive frequency hopping technology is applied is an interference source, the spatial reuse apparatus may use the previously set transmission power without needing to separately adjust power. This is because the Bluetooth device, which is the interference source within the same channel, will disappear.

The spatial reuse apparatus according to an embodiment may determine whether a new signal is a signal originating from a ZigBee device based on the determination that the new signal uses a target band.

The signal originating from the ZigBee device is not an negligible signal like signals generated from the microwave oven and the Bluetooth device to which the adaptive frequency hopping technology is applied, but because a communication interval is basically long, even if SR communication is attempted, interference with the ZigBee device may not occur within a few seconds after the ZigBee device is identified (because ZigBee devices within the same channel do not transmit communication signals).

Therefore, after ZigBee signal identification, a communication device may be configured to obtain TXOP by attempting SR communication within an average interval of ZigBee. At this time, transmission power may be set less (or set proportionally lower) than power of the identified Zig-Bee signal to minimize interference with ZigBee. In this case, transmission power may be set as shown in Equation 2 below.

$$Tx_{power\_new} = Tx_{power} + \beta \cdot \text{Power}_{zigbee} \quad \text{[Equation 2]}$$

In Equation 2, $Tx_{power\_new}$ is newly determined transmission power when a signal generated by the ZigBee device is a new detected signal, $Tx_{power}$ is basic transmission power of existing SR, and $\text{Power}_{zigbee}$ is power of the microwave oven measured when a signal is identified.

ZigBee is widely used as a communication technology for IoT devices where energy saving is important, and may have a long communication interval on average. A beacon interval that can be set in a ZigBee standard is 15.36 ms to 251 s (sec), which is longer than communication intervals of WiFi and Bluetooth (Bluetooth has a communication interval of 15 to 30 ms, and WiFi has a communication interval of less than 10 ms).

In operation 450, the spatial reuse apparatus according to an embodiment may perform spatial reuse simultaneous transmission by adjusting transmission power based on the determination that a new signal is a negligible signal.

The spatial reuse apparatus according to an embodiment may determine a power level corresponding to the new signal based on the determination that the new signal is a negligible signal.

The spatial reuse apparatus according to an embodiment may adjust an allowable power range based on the power level corresponding to the new signal, and may perform spatial reuse simultaneous transmission within the allowable power range.

Figure 5:
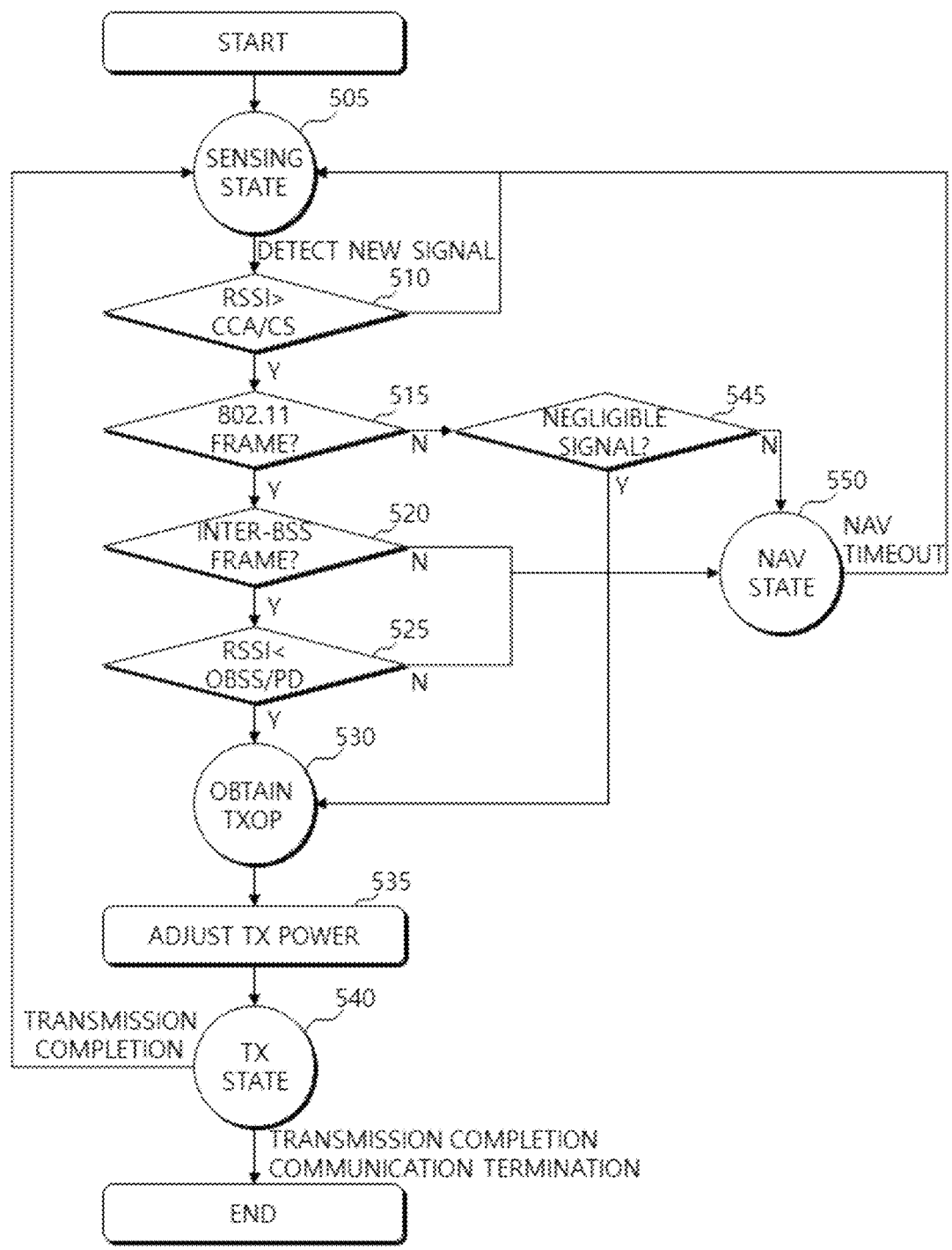
FIG. 5 is a flowchart illustrating a spatial reuse method according to an embodiment.

FIG. 5 is a flowchart illustrating a spatial reuse method according to an embodiment.

For convenience of explanation, operations 510 to 550 are described as being performed using the spatial reuse apparatus 300 shown in FIG. 3. However, operations 510 to 550 may be used via any other suitable electronic device, and within any suitable system.

In addition, operations of FIG. 5 may be performed in the illustrated order and manner, but the order of some operations may be changed or some operations may be omitted without departing from the spirit and scope of the illustrated embodiment. A number of the operations shown in FIG. 5 may be performed in parallel or concurrently.

In operation 505, in a sensing state, the spatial reuse apparatus may continuously receive a communication environment.

In operation 510, when a new signal is detected, the spatial reuse apparatus calculates an RSSI of the corresponding signal and determines whether a corresponding value exceeds a CCA/CS threshold.

When the corresponding value exceeds the CCA/CS threshold, in operation 515, the spatial reuse apparatus determines whether the new signal is an 802.11ax frame. When the new signal is an 802.11ax frame, in operation 520, the spatial reuse apparatus checks whether the new signal is an Inter-BSS frame identical to the existing standard, and performs an SR operation method.

When the new signal is not an 802.11ax frame, in operation 545, the spatial reuse apparatus checks whether the new signal is a negligible signal. When the new signal is a negligible signal, in operation 530, the spatial reuse apparatus may obtain an SR simultaneous transmission opportunity. Thereafter, in operation 535, the spatial reuse apparatus may adjust transmission power according to the type of the new signal, and in operation 540, the spatial reuse apparatus may perform SR communication in a transmission state.

When the corresponding value exceeds a threshold, or when the new signal is not an 802.11ax frame or is not a negligible signal, in operation 550, the spatial reuse apparatus may change the state to a NAV (Network Allocation Vector) state and may not transmit a new signal by determining that the channel is full.

Figure 6:
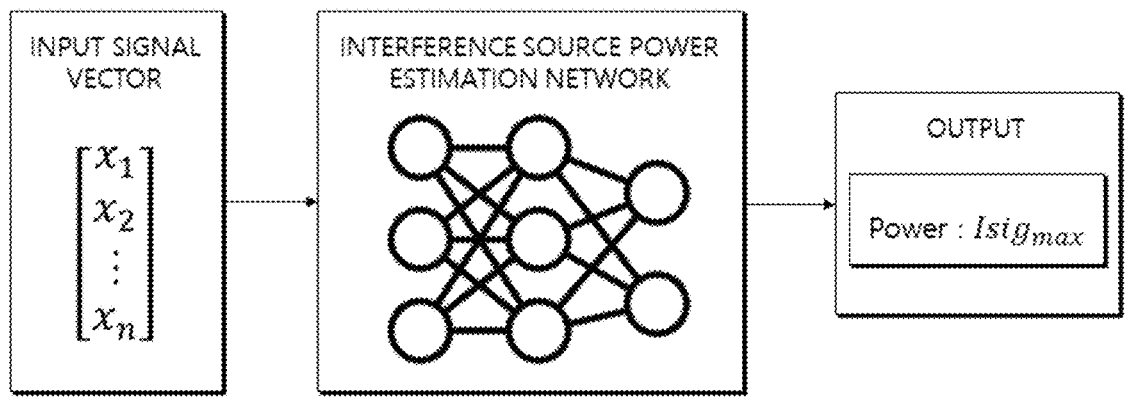
FIG. 6 is a view for explaining an interference source power estimation network according to an embodiment.

FIG. 6 is a view for explaining an interference source power estimation network according to an embodiment.

Referring to FIG. 6, an interference source power estimation network may output signal strength from an input signal vector. At this time, the strength of an output signal ($\text{ISig}_{max}$) may be power of the strongest signal from among negligible signals within the range of a communication environment. A corresponding value may be expressed as a signal power level for each section. The input signal vector may be in-phase, quadrature (I/Q) value, FFT, Amplitude/Phase, etc., but is not limited thereto.

Figure 7:
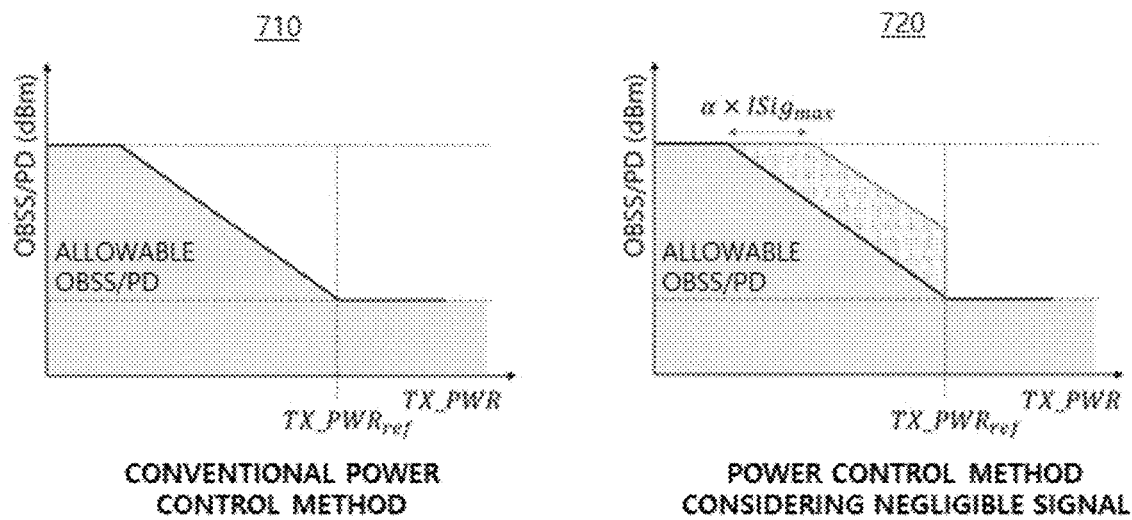
FIG. 7 is a view for explaining a power control method according to an embodiment.

FIG. 7 is a view for explaining a power control method according to an embodiment.

FIG. 7 is a view for explaining a power control method according to an embodiment.

Referring to 710 of FIG. 7, in the existing IEEE 802.11ax standard, allowable TX power is obtained within an allowable power range according to an OBSS/PD threshold.

On the other hand, referring to 720, because the spatial reuse apparatus requires a higher power value during transmission than the strength of a negligible signal, the allowable power range may be increased by adding $\alpha \cdot \text{ISig}_{max}$ derived from an interference source power estimation network prior to basic transmission power of the existing SR.

The spatial reuse apparatus according to an embodiment may build a more efficient communication network by overcoming a situation in which SR simultaneous transmission is impossible due to the negligible signal.

Furthermore, the spatial reuse apparatus according to an embodiment may support interference minimization through more precise power control considering signals other than another BSS signal (e.g., an IEEE 802.11 signal) when performing SR simultaneous transmission.

In concluding the detailed description, those skilled in the art will appreciate that many variations and modifications may be made to the preferred embodiments without substantially departing from the principles of the present invention. Therefore, the disclosed preferred embodiments of the invention are used in a generic and descriptive sense only and not for purposes of limitation.

What is claimed is:

1. A spatial reuse (SR) method in a wireless LAN (WLAN) system, the SR method comprising:
    detecting a new signal by receiving communication environment information;
    comparing strength of the new signal with a first threshold;
    determining whether the new signal is a target signal of the WLAN system based on the determination that the strength of the new signal exceeds the first threshold;
    determining whether the new signal is a negligible signal based on the determination that the new signal is not a target signal of the WLAN system; and
    performing spatial reuse simultaneous transmission by adjusting transmission power based on the determination that the new signal is the negligible signal.

2. The SR method of claim 1, further comprising:
    determining a power level corresponding to the new signal based on the determination that the new signal is the negligible signal.

3. The SR method of claim 2, wherein the performing spatial reuse simultaneous transmission comprises:
    adjusting an allowable power range based on the power level corresponding to the new signal; and
    performing the spatial reuse simultaneous transmission within the allowable power range.

4. The SR method of claim 1, wherein the determining whether the new signal is the negligible signal comprises:
    determining whether the new signal uses a target band corresponding to the target signal of the WLAN system; and
    determining whether the new signal is a signal originating from a preset device based on the determination that the new signal uses the target band.

5. The SR method of claim 4, wherein the determining whether the new signal is the negligible signal comprises:
    determining whether the new signal is a signal originating from a non-communication device based on the determination that the new signal uses the target band;
    determining whether the new signal is a signal originating from a Bluetooth device based on the determination that the new signal uses the target band; and
    determining whether the new signal is a signal originating from a ZigBee device based on the determination that the new signal uses the target band.

* * * * *